United States Patent
Gupta et al.

(10) Patent No.: US 10,949,208 B2
(45) Date of Patent: Mar. 16, 2021

(54) SYSTEM, APPARATUS AND METHOD FOR CONTEXT-BASED OVERRIDE OF HISTORY-BASED BRANCH PREDICTIONS

(71) Applicant: Intel Corporation, Santa Clara, CA (US)

(72) Inventors: Saurabh Gupta, Bengaluru (IN); Niranjan Soundararajan, Santa Clara, CA (US); Ragavendra Natarajan, Mysore (IN); Jared Warner Stark, IV, Portland, OR (US); Lihu Rappoport, Haifa (IL); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 16/221,871

(22) Filed: Dec. 17, 2018

(65) Prior Publication Data
US 2020/0192670 A1 Jun. 18, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3848* (2013.01)

(58) Field of Classification Search
CPC .................................................... G06F 9/3848
See application file for complete search history.

(56) References Cited

U.S. PATENT DOCUMENTS

| | | | | |
|---|---|---|---|---|
| 9,507,598 | B1 * | 11/2016 | Bonanno | G06F 9/30058 |
| 2007/0083739 | A1 * | 4/2007 | Glew | G06F 9/3848 |
| | | | | 712/239 |
| 2008/0072024 | A1 * | 3/2008 | Davis | G06F 9/3848 |
| | | | | 712/239 |
| 2009/0125707 | A1 * | 5/2009 | Olson | G06F 9/3806 |
| | | | | 712/240 |
| 2017/0322810 | A1 * | 11/2017 | Navada | G06F 9/3806 |
| 2018/0173533 | A1 * | 6/2018 | Soundararajan | G06F 9/3848 |
| 2019/0361707 | A1 * | 11/2019 | Vougioukas | G06F 9/3806 |

OTHER PUBLICATIONS

Hongliang Gao, et al., "PMPM: Prediction by Combining Multiple Partial Matches," Journal of Instruction—Level Parallelism 9 (2007), pp. 1-18.

(Continued)

*Primary Examiner* — Jacob Petranek
(74) *Attorney, Agent, or Firm* — Trop, Pruner & Hu, P.C.

(57) ABSTRACT

In one embodiment, an apparatus includes a context-based prediction circuit to receive an instruction address for a branch instruction and a plurality of predictions associated with the branch instruction from a global prediction circuit. The context-based prediction circuit may include: a table having a plurality of entries each to store a context prediction value for a corresponding branch instruction; and a control circuit to generate, for the branch instruction, an index value to index into the table, the control circuit to generate the index value based at least in part on at least some of the plurality of predictions associated with the branch instruction and the instruction address for the branch instruction. Other embodiments are described and claimed.

15 Claims, 10 Drawing Sheets

(56) References Cited

OTHER PUBLICATIONS

Andre Seznec, "A New Case for the TAGE Branch Predictor," ACM, MICRO 2011: The 44th Annual IEEE/ACM International Symposium on Microarchitecture, Dec. 2011, pp. 1-12.
Andre Seznec, "TAGE-SC-L Branch Predictors," Jun. 2014, pp. 1-8.
U.S. Appl. No. 15/857,863, filed Dec. 29, 2017, entitled "System, Apparatus and Method for Controlling Allocations Into a Branch Prediction Circuit of a Processor," by Ragavendra Natarajan, et al.

* cited by examiner

SYSTEM, APPARATUS AND METHOD FOR CONTEXT-BASED OVERRIDE OF HISTORY-BASED BRANCH PREDICTIONS

TECHNICAL FIELD

Embodiments relate to performing branch prediction in a processor.

BACKGROUND

Branch prediction is used to enhance performance in wide, super-scalar processors. Conventional branch predictors use both local and global branch history components. The local predictor makes a direction prediction for a branch instruction (using an instruction pointer (IP) of the instruction) based only on the IPs behavior in the recent past. The global predictor, on the other hand, makes a direction prediction for the branch instruction based on the behavior of all the recently executed branch instructions in the program and captures correlations for different global history lengths. However, with a default scheme to select a prediction from a global predictor that tracks the longest history as a definitive final prediction, some undesired amount of mispredictions occur.

DETAILED DESCRIPTION

In various embodiments, techniques are provided to improve branch prediction quality by overriding a default policy of selecting a prediction from a longest history length table of a plurality of global predictors. To this end, embodiments provide a context-based predictor that is configured as an adjunct predictor and is used to aid in determination of a final prediction for a given branch instruction. More specifically, embodiments may use multiple predictions from global history-based predictors to create a context in which a baseline prediction may be overridden based on the eventual direction taken by branch instructions in these contexts. In this way, overall branch prediction accuracy may be increased for a very limited increase in chip area. Embodiments may decrease mispredictions for a large set of benchmark traces for some category of workloads.

Figure 1:
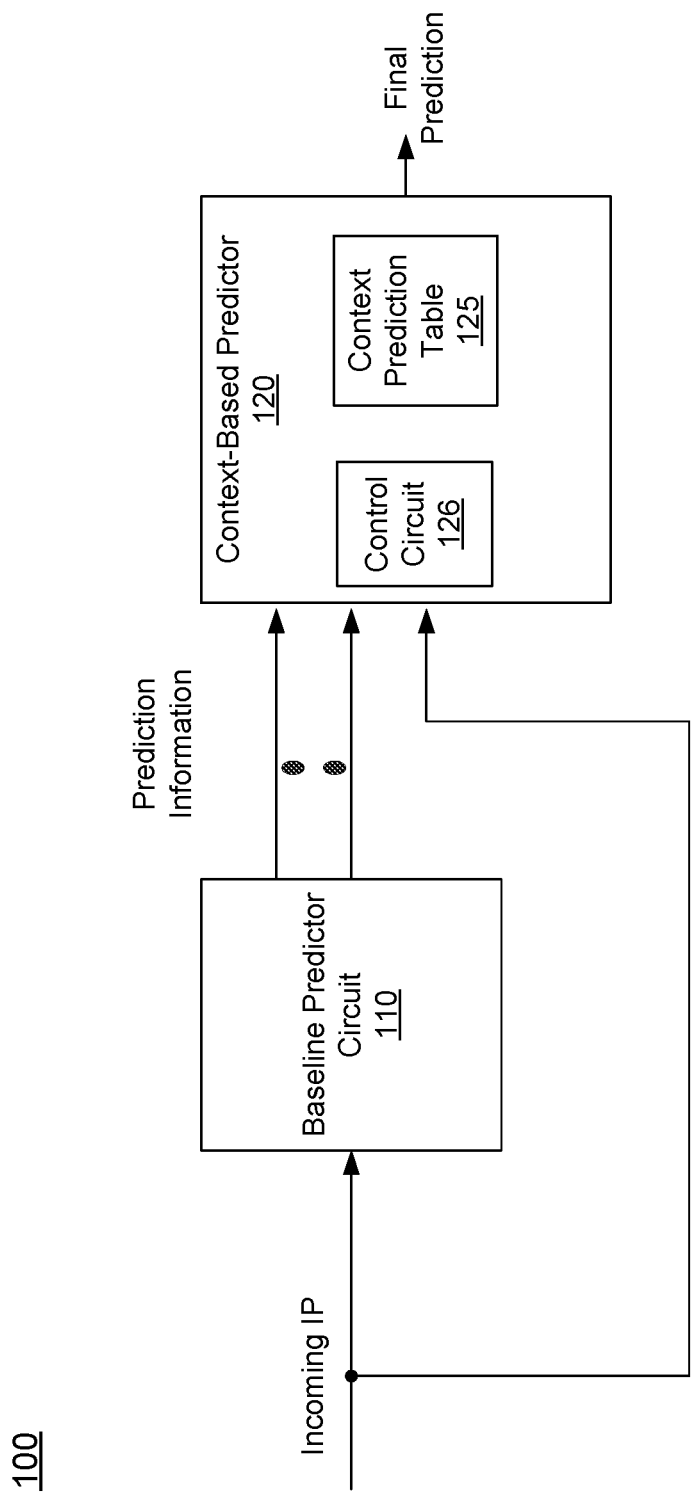
FIG. 1 is a block diagram of a prediction circuit in accordance with an embodiment of the present invention.

Referring now to FIG. 1, shown is a block diagram of a prediction circuit in accordance with an embodiment of the present invention. As shown in FIG. 1, prediction circuit 100 includes multiple predictors, including a baseline predictor circuit 110. Such baseline predictor circuit 110 may include at least one bimodal predictor and a set of global predictors, e.g., implemented as a number of global tables. As seen, baseline predictor circuit 110 is coupled to receive an incoming address, namely an instruction pointer (IP) address of a given instruction. Using this IP as an index, baseline predictor circuit 110 may perform a lookup within one or more corresponding tables to determine whether an entry is present for the instruction address, and if so, a corresponding prediction is output. As illustrated, multiple predictions may be output from baseline predictor circuit 110 to a context-based predictor 120.

In a particular embodiment, the set of global predictors of baseline prediction circuit 110 provides global predictions, namely predictions based on multiple recently executed branch instructions. These multiple predictor tables are looked up in parallel and provide predictions as to direction (taken vs. not taken) for conditional branches based on outcome of prior branches (i.e., global history). Although the scope of the present invention is not limited in this regard, in embodiments there may be a plurality of such global tables, e.g., global tables g0-g6. Of course different numbers of global tables may be provided in other embodiments. Each such global table may be associated with a different granularity or range of history of branch instructions, such that the first global table (e.g., g0) is associated with a shortest history duration, which as an example may be on the order of between 5 and 15 branches. The higher global tables may be associated with longer history periods, e.g., ranging from approximately 100 to 200 or more branches. And in this example, a final one of the global tables (e.g., g6) is associated with a longest history duration.

In embodiments herein, context-based predictor 120 may be used to dynamically override a prediction made by baseline predictor circuit 110, e.g., based at least in part on context information associated with the received predictions. As will be described herein, context-based predictor 120 includes control circuitry (implemented as a control circuit 126) and one or more tables (implemented as a context prediction table 125) that may store prediction information associated with particular IP addresses. To enable a more accurate final prediction, control circuit 126 uses different predictions to create a context, which is the index into table 125. In an embodiment, table 125 includes a plurality of entries, each associated with a branch instruction and including a context prediction, e.g., in the form of a counter value which may implemented with one of a set of saturating confidence counters. And note that this index that is generated is different than the IP itself, which is used to index into the global tables of baseline predictor circuit 110. For a given context or index, the counters in table 125 are trained based on the eventual direction of the branch. In an embodiment, context prediction table 125 is organized as a tagless direct-mapped structure.

Depending upon the information found in a corresponding entry of context prediction table 125, a final prediction is output. More specifically, based on the stored information, this final prediction may simply be one of the predictions provided by baseline predictor circuit 110, or it may be a prediction based on the information present in context-based predictor 120, which thus acts to override the one or more predictions received from baseline predictor circuit 110.

In general, a default policy without an override is to choose the longest history table's prediction that hits. This is so, since the longest history has the most amount of context/information to give a better quality prediction for the branch. But, this prediction can be sub-optimal in some cases. The predictions from the longest hitting history may not be the most accurate, due to factors like aliasing of multiple IPs in a single entry or IP's predictions showing a lot of variability in the direction and counters not being saturated. Embodiments provide an intelligent scheme that can identify when the default policy is less accurate and ought to be overridden. Embodiments may also track the correct final prediction and provide it when the context is strong enough to override a baseline prediction. These contexts may be learned dynamically using context prediction table 125, via the saturating up-down counters that track the eventual direction taken by branches, based on prior occurrences. Such information may be used to override a baseline prediction. In one embodiment, context prediction table 125 is configured as a direct-mapped tagless structure with 1024 entries (each entry is a 4-bit counter). Understand while shown at this high level in the embodiment of FIG. 1, many variations and alternatives are possible.

Figure 2A:
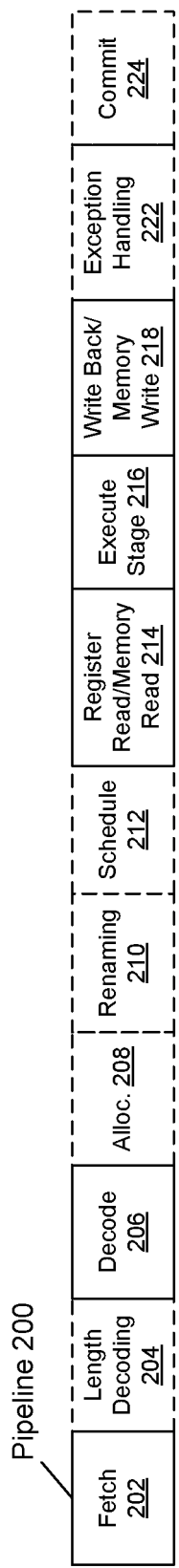
FIG. 2A is a block diagram illustrating an in-order pipeline and a register renaming stage, out-of-order issue/execution pipeline according to at least one embodiment of the invention.
Figure 2B:
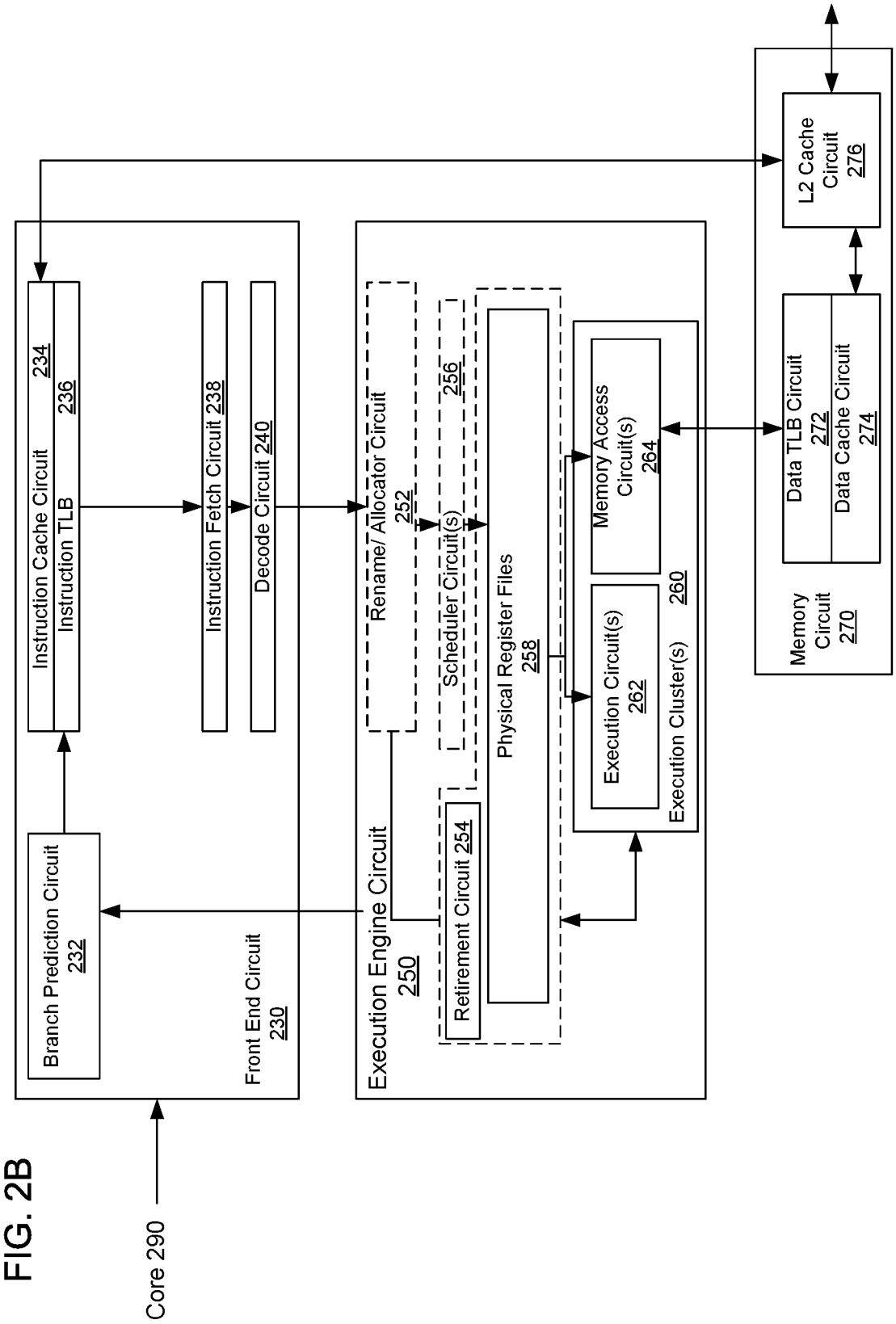
FIG. 2B is a block diagram illustrating an in-order architecture core and a register renaming logic, out-of-order issue/execution logic to be included in a processor according to at least one embodiment of the invention.

FIG. 2A is a block diagram illustrating an in-order pipeline and a register renaming stage, out-of-order issue/execution pipeline according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrate the register renaming, out-of-order issue/execution pipeline. Similarly, the solid lined boxes in FIG. 2B illustrate the in-order architecture logic, while the dashed lined boxes illustrate the register renaming logic and out-of-order issue/execution logic.

In FIG. 2A, a processor pipeline 200 includes a fetch stage 202 which may include a branch predictor as described herein, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

In FIG. 2B, arrows denote a coupling between two or more circuits and the direction of the arrow indicates a direction of data flow between those circuits. FIG. 2B shows a processor core 290 including a front end circuit 230 coupled to an execution engine circuit 250, and both are coupled to a memory circuit 270.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end circuit 230 includes a branch prediction circuit 232 coupled to an instruction cache circuit 234, which is coupled to an instruction translation lookaside buffer (TLB) 236, which is coupled to an instruction fetch circuit 238, which is coupled to a decode circuit 240. Branch prediction circuit 232 may be implemented as described herein (e.g., as in FIG. 1) including baseline and context-based predictors to enhance prediction accuracy.

Decode circuit 240 may decode instructions, and generate as an output one or more micro-operations, micro-code entry points, micro-instructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. Instruction cache circuit 234 is further coupled to a level 2 (L2) cache circuit 276 in the memory circuit 270. Decode circuit 240 is coupled to a rename/allocator circuit 252 in the execution engine circuit 250.

Execution engine circuit 250 includes the rename/allocator circuit 252 coupled to a retirement circuit 254 and a set of one or more scheduler circuit(s) 256. The scheduler circuit(s) 256 represents any number of different schedulers, including reservations stations, central instruction window, etc. The scheduler circuit(s) 256 is coupled to the physical register files 258. Each of the physical register files 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register files 258 are overlapped by the retirement circuit 254 to illustrate various ways in which register renaming and out-of-order execution may be implemented (e.g., using a reorder buffer(s) and a retirement register file(s), using a future file(s), a history buffer(s), and a retirement register file(s); using a register map and a pool of registers, etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc.

The retirement circuit 254 and the physical register files 258 are coupled to the execution cluster(s) 260. The execution cluster(s) 260 includes a set of one or more execution circuits 262 and a set of one or more memory access circuits 264. The execution circuit 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler circuit(s) 256, physical register files 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s), and/or execution cluster—and in the case of a separate memory access pipeline, certain embodiments are implemented in which only the execution cluster of this pipeline has the memory access circuit(s) 264). It should also be understood that where separate pipelines are used, one or more of these pipelines may be out-of-order issue/execution and the rest in-order. As illustrated, feedback information may be provided from execution engine circuit 250 to branch prediction circuit 232 to provide feedback information, indicating whether branch instructions were correctly predicted or mispredicted, so that updating of prediction information can occur as described herein.

The set of memory access circuits 264 is coupled to the memory circuit 270, which includes a data TLB circuit 272 coupled to a data cache circuit 274 coupled to a level 2 (L2) cache circuit 276. In one exemplary embodiment, the memory access circuits 264 may include a load unit, a store address unit, and a store data unit, each of which is coupled to the data TLB circuit 272 in the memory circuit 270. The L2 cache circuit 276 is coupled to one or more other levels of cache and eventually to a main memory.

With reference back to FIG. 2A, by way of example, the exemplary register renaming, out-of-order issue/execution core architecture may implement the pipeline 200 as follows: 1) the instruction fetch circuit 238 performs the fetch and length decoding stages 202 and 204; 2) the decode circuit 240 performs the decode stage 206; 3) the rename/allocator circuit 252 performs the allocation stage 208 and renaming stage 210; 4) the scheduler circuit(s) 256 performs the schedule stage 212; 5) the physical register files 258 and the memory circuit 270 perform the register read/memory read stage 214; the execution cluster 260 performs the execute stage 216; 6) the memory circuit 270 and the physical register files 258 perform the write back/memory write stage 218; 7) various circuits may be involved in the exception handling stage 222; and 8) the retirement circuit 254 and the physical register files 258 perform the commit stage 224.

Core 290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.); or possible other ISAs. It should be understood that core 290 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 234/274 and a shared L2 cache circuit 276, alternative embodiments may have a single internal cache for both instructions and data, such as, for example, a level 1 internal cache, or multiple levels of internal cache. In some embodiments, the system may include a combination of an internal cache and an external cache that is external to the core and/or the processor. Alternatively, all of the cache may be external to the core and/or the processor.

Figure 3:
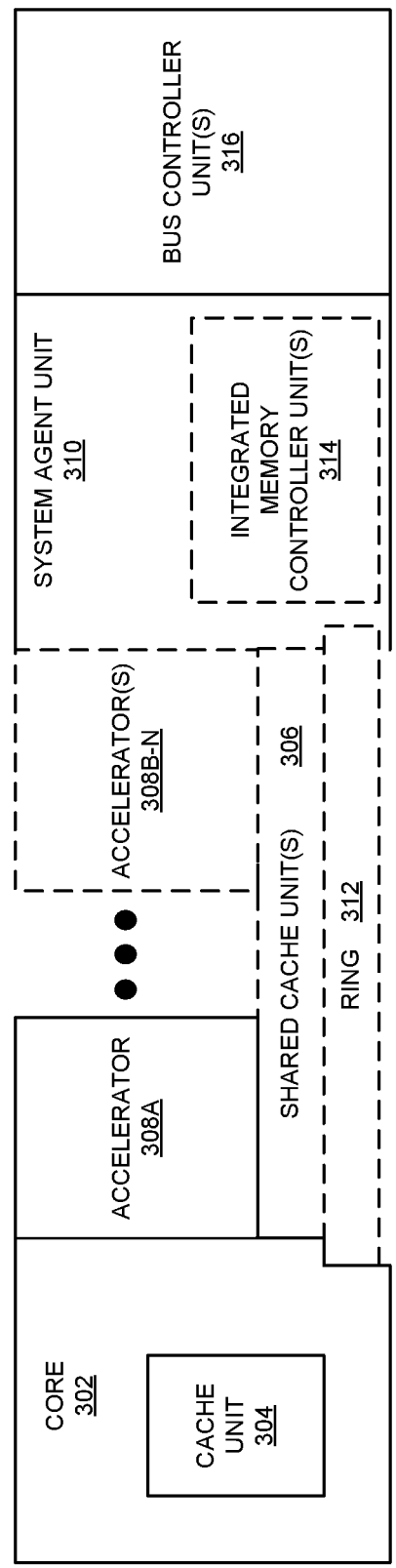
FIG. 3 is a block diagram of a processor with integrated memory controller and accelerator functionality according to embodiments.

FIG. 3 is a block diagram of a processor 300 with integrated memory controller and accelerator functionality according to embodiments. The solid lined boxes in FIG. 3 illustrate a processor 300 with a single core 302, a single accelerator 308A, a system agent unit 310, a set of one or more bus controller units 316, while the optional addition of the dashed lined boxes illustrates an alternative processor 300 with multiple accelerators 308B-N, and a set of one or more integrated memory controller unit(s) 314 in the system agent unit 310. At least core 302 may include a branch prediction circuit as described herein.

The memory hierarchy includes one or more levels of cache within the core 302 including a cache unit 304, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring-based interconnect unit 312 interconnects the accelerator(s) 308, the set of shared cache units 306, and the system agent unit 310, alternative embodiments may use any number of well-known techniques for interconnecting such units.

The system agent unit 310 includes those components coordinating and operating core 302 and accelerator(s) 308A-N. The system agent unit 310 may include for example a power control unit (PCU) and a display unit (not shown). The PCU may be or include logic and components to regulate the power state of the core 302 and accelerator(s) 308A-N. The display unit is for driving one or more externally connected displays.

While a single core embodiment is shown for ease of illustration, understand that multiple cores may be present. Such cores may be homogenous or heterogeneous in terms of architecture and/or instruction set. For example, some of the cores may be in-order while others are out-of-order. As another example, two or more of the cores may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 300 may be a part of and/or may be implemented on one or more substrates using any of a number of process technologies, such as, for example, BiCMOS, CMOS, or NMOS.

Figure 4:
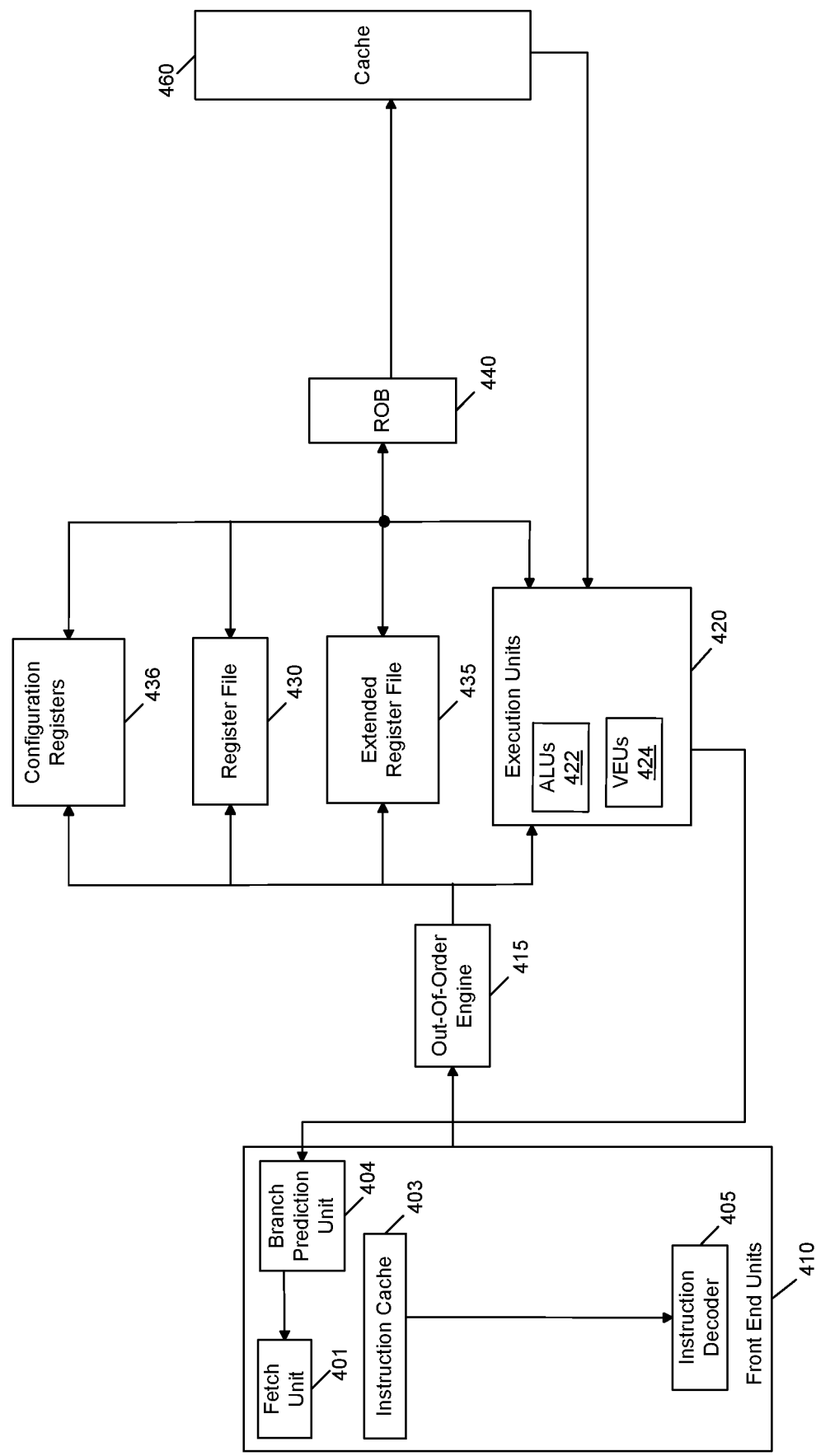
FIG. 4 is a block diagram of a micro-architecture of a processor core in accordance with one embodiment of the present invention.

Referring now to FIG. 4, shown is a block diagram of a micro-architecture of a processor core in accordance with one embodiment of the present invention. As shown in FIG. 4, processor core 400 may be a multi-stage pipelined out-of-order processor.

As seen in FIG. 4, core 400 includes front end units 410, which may be used to fetch instructions to be executed and prepare them for use later in the processor pipeline. For example, front end units 410 may include a fetch unit 401, an instruction cache 403, and an instruction decoder 405. Front end units 410 may further include a branch prediction unit 404, implemented as described herein. The resulting branch decision information can be provided to fetch unit 401 to direct the next IP to be fetched to obtain instructions for execution within processor 400. As further illustrated, feedback information may be received by branch prediction unit 404 to indicate whether corresponding branch predictions were correctly predicted or mispredicted. Such information may be provided from corresponding execution units 420 and may include an index to identify a given entry within a context-based predictor, as described further below. In some implementations, front end units 410 may further include a trace cache, along with microcode storage as well as a micro-operation storage. Fetch unit 401 may fetch macro-instructions, e.g., from memory or instruction cache 403, and feed them to instruction decoder 405 to decode them into primitives, i.e., micro-operations for execution by the processor.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435. Register file 430 may include separate register files for integer and floating point operations. Extended register file 435 may provide storage for vector-sized units, e.g., 256 or 512 bits per register. As further illustrated in FIG. 4, core 400 also includes a set of configuration registers 436, which may include various configuration registers to configure modes of operation and execution within core 400.

Various resources may be present in execution units 420, including, for example, various integer, floating point, and single instruction multiple data (SIMD) logic units, among other specialized hardware. For example, such execution units may include one or more arithmetic logic units (ALUs) 422 and one or more vector execution units 424, among other such execution units.

Results from the execution units may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. Of course, ROB 440 may handle other operations associated with retirement.

As shown in FIG. 4, ROB 440 is coupled to a cache 460 which, in one embodiment may be a low level cache (e.g., an L1 cache), although the scope of the present invention is not limited in this regard. As further shown in FIG. 4, execution units 420 can be directly coupled to cache 460. From cache 460, data communication may occur with higher level caches, system memory and so forth. While shown with this high level in the embodiment of FIG. 4, understand the scope of the present invention is not limited in this regard. For example, while the implementation of FIG. 4 is with regard to an out-of-order machine such as of an Intel® x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

At prediction time, various information including the branch IP, a default prediction, at least one alternate prediction and information as to whether the prediction came from a new entry, is used to create an index into the context-based table. A counter is read out of an entry of the table based on the index. If the value of the counter is greater than a threshold, then the prediction from the table overrides the default baseline prediction. Otherwise, there is no override. Note that with this scheme, it is possible that for different instances of execution of a single instruction, different context table entries will be accessed.

Figure 5:
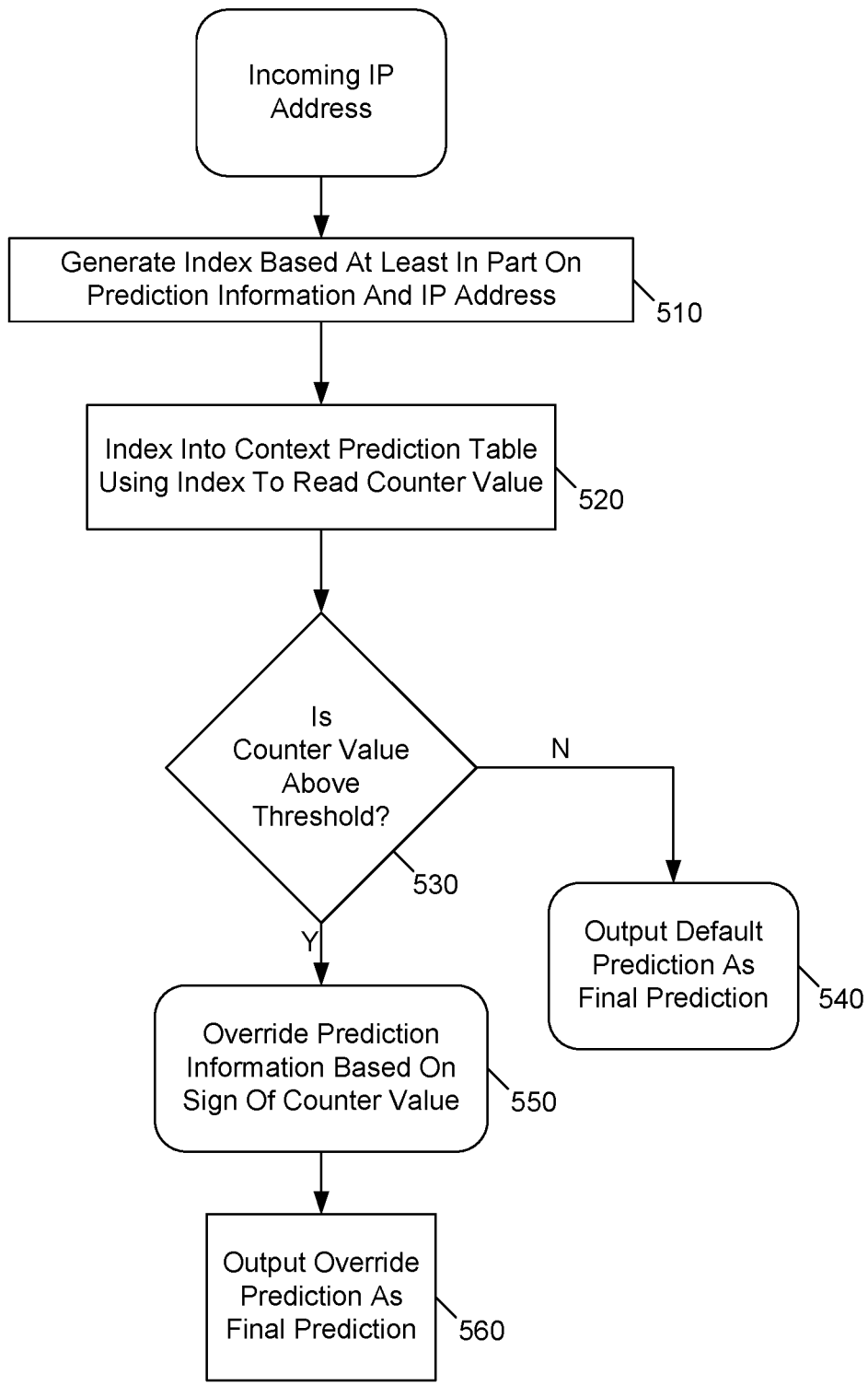
FIG. 5 is a flow diagram of a method in accordance with an embodiment of the present invention.

Referring now to FIG. 5, shown is a flow diagram of a method in accordance with an embodiment of the present invention. As shown in FIG. 5, a method 500 uses a context-based predictor in accordance with an embodiment. As such, method 500 may be performed by hardware circuitry, software, firmware and/or combinations thereof. In one particular embodiment, method 500 may be performed by hardware circuitry within a context-based predictor, such as control circuit 126 in FIG. 1.

As seen, method 500 begins in response to receipt of an incoming IP address. Assume for purposes of discussion that this IP address is for a branch-type instruction. At block 510, an index is generated. More specifically, this index, which is used to perform a lookup within a table of the context-based predictor, may be generated using prediction information received from one or more baseline predictor circuits and the IP address itself. This index generation thus leverages context information in forming the index.

Different indexing schemes represent the context differently and in turn affect the ability to learn cases where an override prediction is more accurate. In one embodiment, the following index generation function may be used to realize good misses per thousand instruction (MPKI) reductions:

$$\text{Index} = ((IP<<6) + (ADDITIONAL\_CONTEXT<<3) + (LPRED<<2) + (SLPRED<<1) + LNEW) \% \text{TABLE\_SIZE}. \quad \text{EQ. [1]}$$

where, IP=Branch IP being predicted

ADDITIONAL_CONTEXT=Described below in more detail

LPRED=Prediction given by longest hitting history table (ranges 0-1)

SLPRED=Prediction given by second longest hitting history table (ranges 0-1)

LNEW=Is LPRED given by a newly allocated entry (ranges 0-1)

TABLE_SIZE=number of entries in the table

Note any alternate prediction can be incorporated to override the default policy. The second longest hitting table is used for an alternate prediction in the above indexing scheme, however, other criteria can be as follows: (a) alternate prediction can be prediction based on a most confident hitting table entry; (b) alternate prediction can also be a prediction coming from bimodal tables; and/or (c) any alternate source of prediction such as an adjunct predictor.

In the above indexing scheme of EQ. [1], an ADDITIONAL_CONTEXT is also incorporated to distinguish when an override of baseline policy is beneficial or not. Some options of context are as follows: (a) a combination of table numbers of highest hitting table and second longest history table; and (b) a hit vector representing which tables found a matching tag in the tables (i.e., a hit). Note that this additional context can be omitted completely if the table size is small, to enable learning for greater numbers of IPs. For a limited size configuration, best results may be obtained when ADDITIONAL_CONTEXT is not used (i.e., INDEX=((IP<<3)+(LPRED<<2)+(SLPRED<<1)+LNEW) % TABLE_SIZE is used to generate an index).

Next, at block 520 the table may be indexed using this generated index to read a counter value of a given entry. Although the scope of the present invention is not limited in this regard, assume for purposes of example a four-bit counter that may be implemented as a signed counter, and thus is able to count both positively and negatively. Understand that additional information may be present in a given entry, in some embodiments.

Still with reference to FIG. 5, control next passes to diamond 530 to determine whether the counter value (e.g., an absolute value of the counter) exceeds a threshold value, in an embodiment. Continuing with the above example of a four-bit counter, this threshold value may be set at four. Note then that this threshold value may correspond to a relatively high level of confidence that the prediction indicated by the counter value is accurate. If it is determined that the counter value does not exceed this threshold value, at block 540 a default prediction value, e.g., a given one of the multiple received prediction values, may be output as a final prediction. In one embodiment, this default value may be set to be the global prediction associated with a longest global history; however other default values are of course possible. Note that this final prediction is output, e.g., to an instruction fetch unit, which may fetch an instruction corresponding to an IP address for the predicted direction of the branch instruction.

Still with reference to FIG. 5, otherwise if it is determined that the counter value exceeds the threshold value, control passes to block 550. There the baseline predictions may be overwritten. More specifically, the baseline predictions may be overwritten with a final prediction that is based on a sign of the counter value. In instances when the counter value is a positive number that exceeds the threshold, the predicted direction is taken. Instead a negative count value that exceeds the threshold indicates that the predicted direction is not taken. Then at block 560, this override prediction is output as a final prediction. Understand while shown at this high level in the embodiment of FIG. 5, many variations and alternatives are possible.

Figure 6:
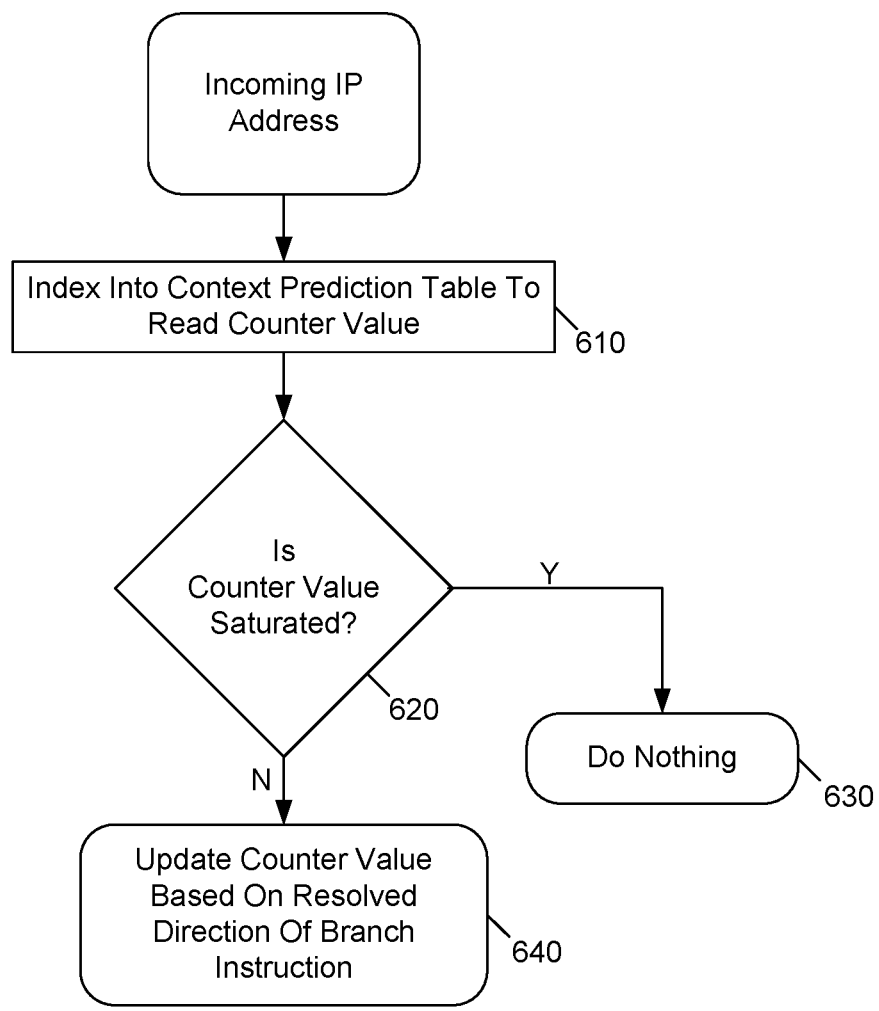
FIG. 6 is a flow diagram of a method in accordance with another embodiment of the present invention.

When a branch instruction completes execution, the saturating counters of the context-based predictor (and the baseline predictors) are trained in the direction of the final outcome of the branch, i.e., increment if taken and decrement if not-taken. Referring now to FIG. 6, shown is a flow diagram of a method in accordance with another embodiment of the present invention. More specifically method 600 of FIG. 6 is a method for updating a context-based predictor at branch execution/resolution time. Method 600 may be performed by hardware circuitry, software, firmware and/or combinations thereof, e.g., by hardware circuitry within a context-based predictor, such as control circuit 126 in FIG. 1.

As illustrated, method 600 begins when an incoming IP address is received in the context-based predictor, e.g., via a feedback path, which provides information regarding an executed branch-based instruction. In an embodiment, this feedback information may include an index of the instruction, namely the same index that was previously dynamically generated for the IP address based on the context. Such index may flow through the pipeline with the instruction. Since the index contains several bits from the IP address, only additional bits may flow through the pipeline with the instruction. In other cases, reference may be made to a table to obtain the index based on some unique ID associated with the dynamic instance of the instruction.

In any event, at block 610 a table of the context-based predictor may be indexed with this index value. More specifically, an entry may be accessed via this index and a counter value is read. Next it is determined at diamond 620 whether the counter value is saturated. As discussed above, in an embodiment with a signed counter implementation, saturation may be at a maximum positive or negative value. If the counter is saturated, no further operations occur for updating the context-based predictor based on this feedback information (block 630).

Instead if it is determined that the counter value is not saturated, control passes to block 640 where the value of the counter may be updated based on the resolved direction of the branch. In the case that the resolved direction of the branch was taken and the prediction made using the information from the context-based predictor also was taken, the update may be by way of increment. Similarly, in the case that the resolved direction of the branch was not taken and the prediction made using the information from the context-based predictor also was not taken, the update may be by way of decrement. If the predicted direction of the branch was mispredicted and the resolved direction of the branch that actually occurred was not as predicted, the counter value may be updated accordingly. In the case of a misprediction of a taken branch (when in fact the branch was not taken), the count may be decremented. Similarly, if the prediction of the branch was not taken and instead the resolved direction was in fact taken, the counter value may be incremented. Understand while shown at this high level in the embodiment of FIG. 6, many variations and alternatives are possible.

To exemplify prediction improvements that may be realized using embodiments, consider the following code in Table 1.

TABLE 1

```
for (i=0; I < N; i++) // N is a large number
{
    for (j=0; j < a[i]; j++)
    {
        //do something (non-branchy code)
    }
}
```

In this example code, first assume a[i] is populated with two distinct values (say A, B and A<B) such that the exit prediction of loop iteration count A just fits in a global history length captured by a second highest global history length table and the loop exit prediction for iteration count B fits in a global history length captured by the highest global history length table. Then assume, a[i] is next populated with more values of A than B (e.g., {A, A, A, A, A, A, B, B} and this pattern repeats. Without an embodiment, after "B, B" the following "A" iterations will result in mispredictions due to a default policy of longer history matching. On the other hand, embodiments override a baseline policy based on the context and will be more effective for this code.

Figure 7:
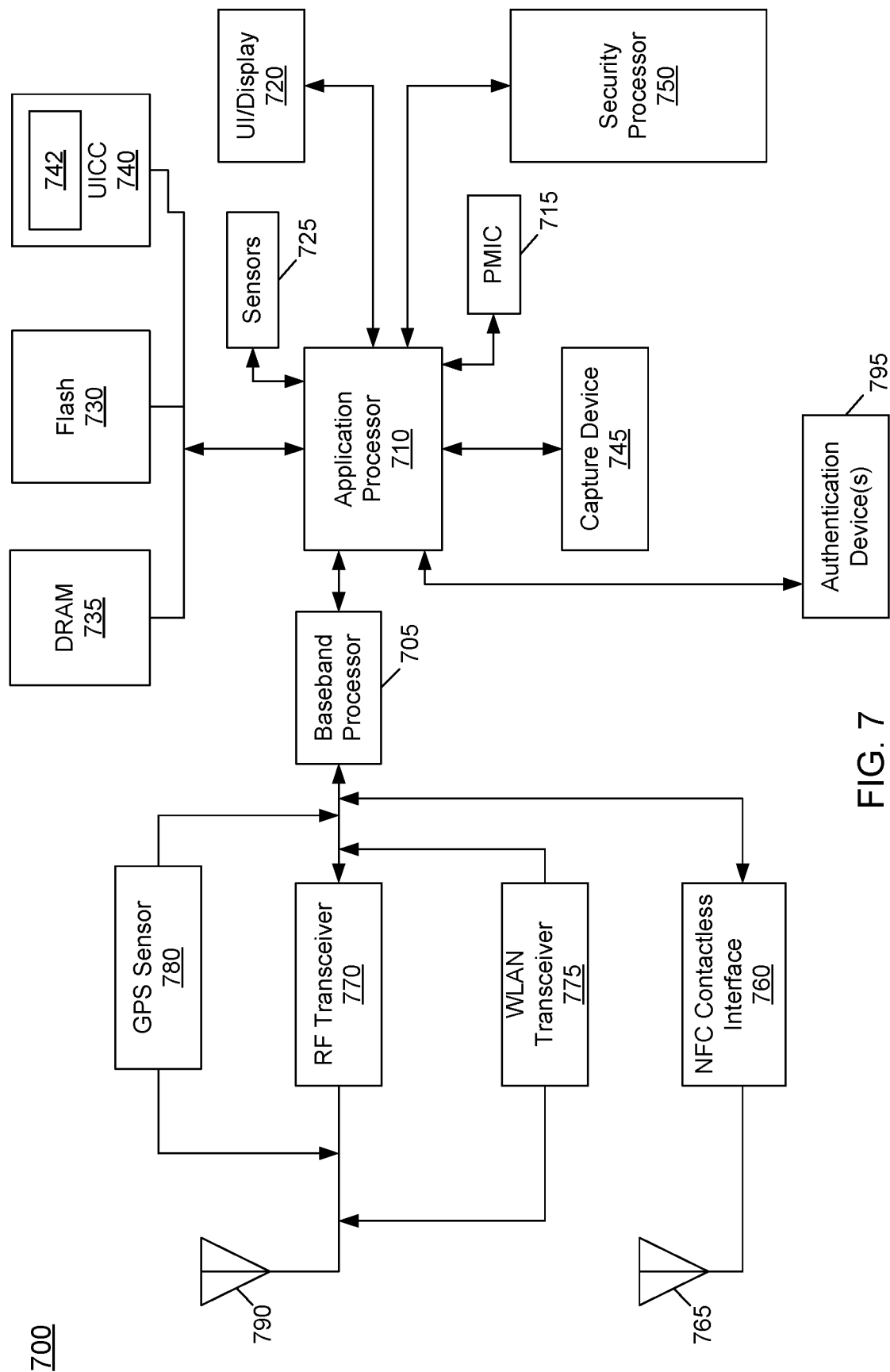
FIG. 7 is a block diagram of an example system with which embodiments can be used.

Embodiments may be implemented in many different system types, ranging from small portable devices to large server systems and device types in between. Referring now to FIG. 7, shown is a block diagram of an example system with which embodiments can be used. As seen, system 700 may be a smartphone or other wireless communicator or any other Internet of Things (IoT) device. A baseband processor 705 is configured to perform various signal processing with regard to communication signals to be transmitted from or received by the system. In turn, baseband processor 705 is coupled to an application processor 710, which may be a main CPU of the system to execute an OS and other system software, in addition to user applications such as many well-known social media and multimedia applications. Application processor 710 may further be configured to perform a variety of other computing operations for the device. In embodiments, application processor 710 may include a branch predictor as described herein. More specifically, the branch predictor may override predictions of a global predictor or other baseline predictors, based at least in part on context-based information stored in a context-based predictor, to improve predictions made in the other predictors as described herein.

In turn, application processor 710 can couple to a user interface/display 720, e.g., a touch screen display. In addition, application processor 710 may couple to a memory system including a non-volatile memory, namely a flash memory 730 and a system memory, namely a DRAM 735. As further seen, application processor 710 also couples to a capture device 745 such as one or more image capture devices that can record video and/or still images.

Still referring to FIG. 7, a universal integrated circuit card (UICC) 740 comprises a subscriber identity module, which in some embodiments includes a secure storage 742 to store secure user information. System 700 may further include a security processor 750 that may implement a trusted executed environment (TEE), and which may couple to application processor 710.

A plurality of sensors 725, including one or more multi-axis accelerometers may couple to application processor 710 to enable input of a variety of sensed information such as motion and other environmental information. In addition, one or more authentication devices 795 may be used to receive, e.g., user biometric input for use in authentication operations. As further illustrated, a near field communication (NFC) contactless interface 760 is provided that communicates in a NFC near field via an NFC antenna 765. While separate antennae are shown in FIG. 7, understand that in some implementations one antenna or a different set of antennae may be provided to enable various wireless functionality.

A power management integrated circuit (PMIC) 715 couples to application processor 710 to perform platform level power management. To this end, PMIC 715 may issue power management requests to application processor 710 to enter certain low power states as desired. Furthermore, based on platform constraints, PMIC 715 may also control the power level of other components of system 700.

To enable communications to be transmitted and received such as in one or more wireless networks, various circuitry may be coupled between baseband processor 705 and an antenna 790. Specifically, a radio frequency (RF) transceiver 770 and a wireless local area network (WLAN) transceiver 775 may be present. In general, RF transceiver 770 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 780 may be present. Other wireless communications such as receipt or transmission of radio signals, e.g., AM/FM and other signals may also be provided. In addition, via WLAN transceiver 775, local wireless communications, such as according to a Bluetooth™ or IEEE 802.11 standard can also be realized.

Figure 8:
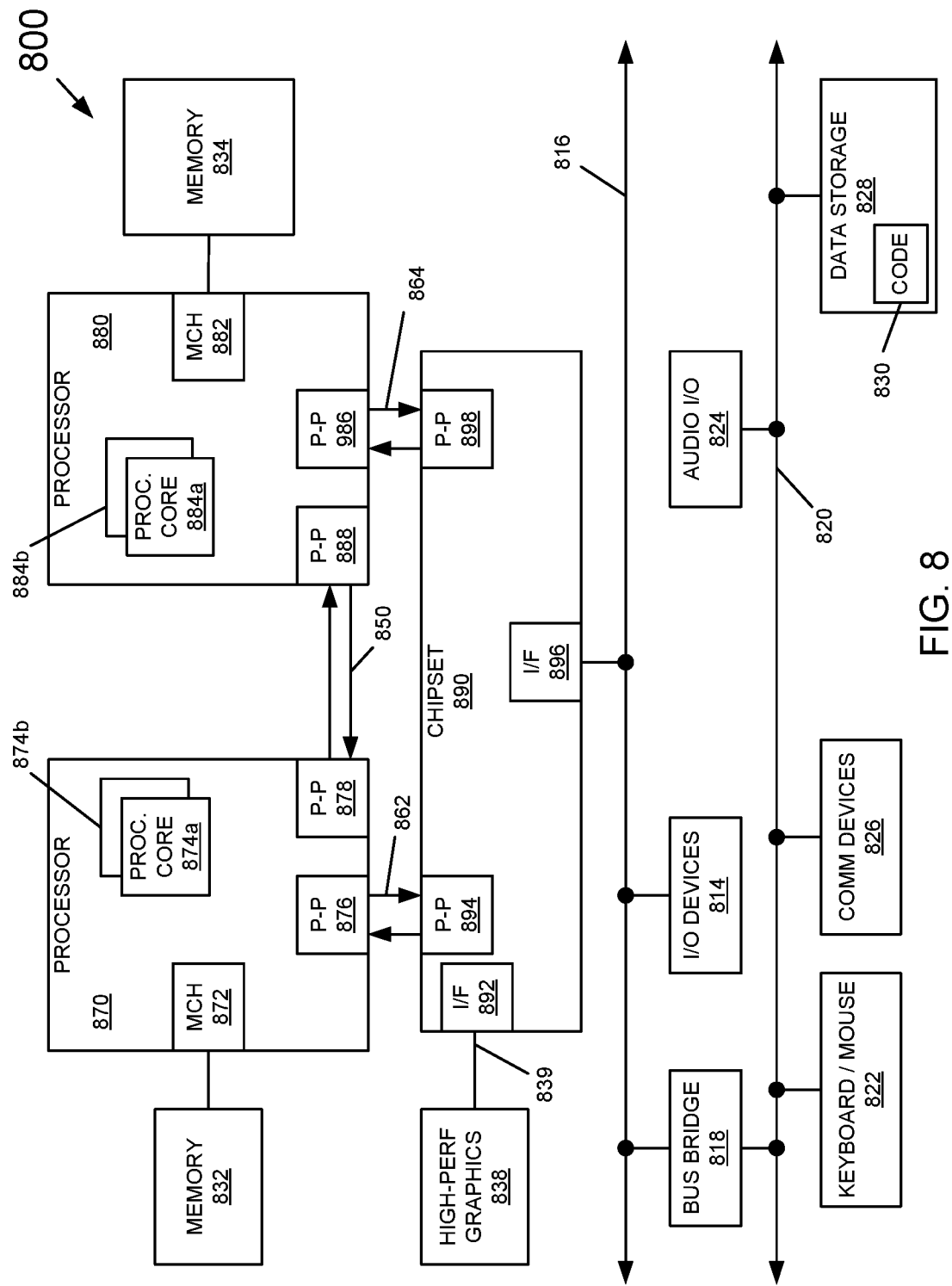
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 800 is a point-to-point interconnect system such as a server system, and includes a first processor 870 and a second processor 880 coupled via a point-to-point interconnect 850. As shown in FIG. 8, each of processors 870 and 880 may be multicore processors such as SoCs, including first and second processor cores (i.e., processor cores 874a and 874b and processor cores 884a and 884b), although potentially many more cores may be present in the processors. The various processor cores of processors 870 and 880 may include a branch predictor as described herein. More specifically, the branch predictor may override predictions of a global predictor or other baseline predictors, based at least in part on context-based information stored in a context-based predictor, to improve predictions made in the other predictors.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of main memory (e.g., a DRAM) locally attached to the respective processors. First processor 870 and second processor 880 may be coupled to a chipset 890 via P-P interconnects 852 and 854, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a non-volatile storage or other mass storage device. As seen, data storage unit 828 may include code 830, in one embodiment. As further seen, data storage unit 828 also includes a trusted storage 829 to store sensitive information to be protected. Further, an audio I/O 824 may be coupled to second bus 820. Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
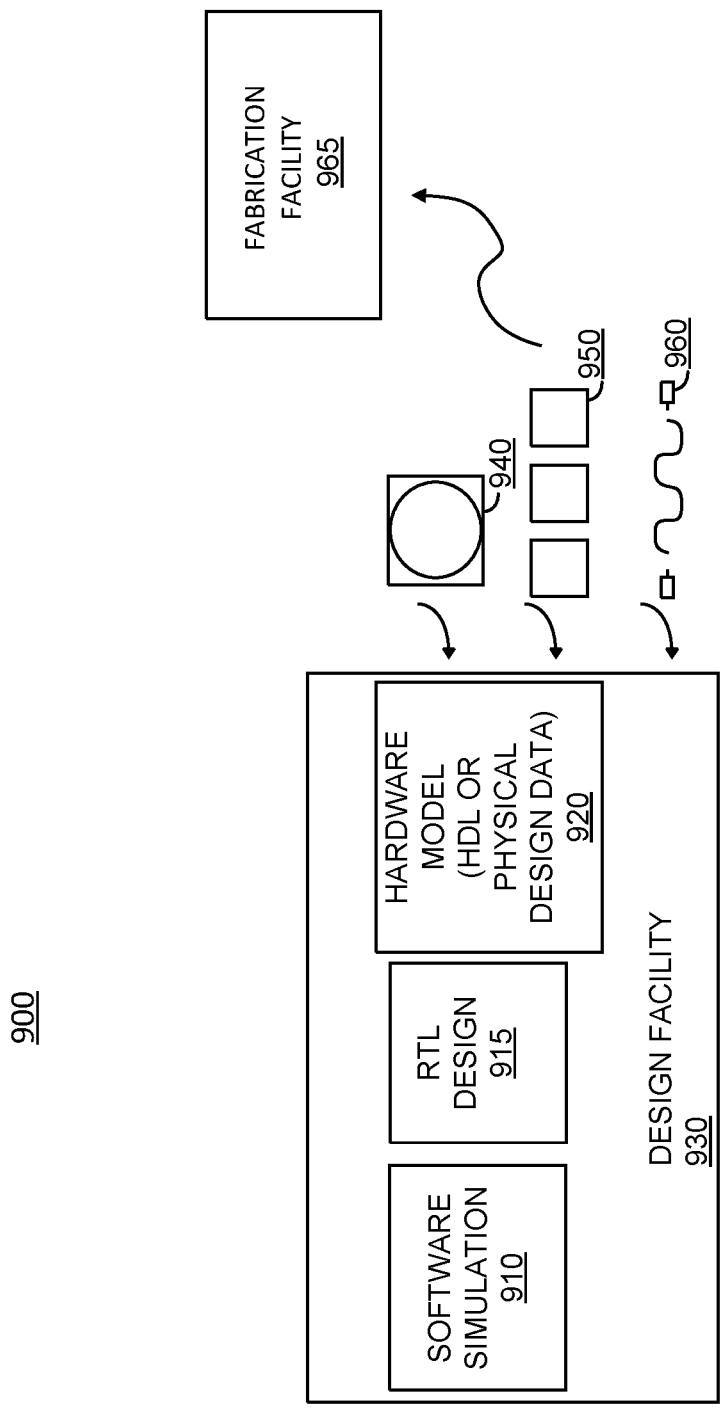
FIG. 9 is a block diagram illustrating an IP core development system used to manufacture an integrated circuit to perform operations according to an embodiment.

FIG. 9 is a block diagram illustrating an IP core development system 900 that may be used to manufacture an integrated circuit to perform operations according to an embodiment. The IP core development system 900 may be used to generate modular, re-usable designs that can be incorporated into a larger design or used to construct an entire integrated circuit (e.g., an SoC integrated circuit). A design facility 930 can generate a software simulation 910 of an IP core design in a high level programming language (e.g., C/C++). The software simulation 910 can be used to design, test, and verify the behavior of the IP core. A register transfer level (RTL) design can then be created or synthesized from the simulation model. The RTL design 915 is an abstraction of the behavior of the integrated circuit that models the flow of digital signals between hardware registers, including the associated logic performed using the modeled digital signals. In addition to an RTL design 915, lower-level designs at the logic level or transistor level may also be created, designed, or synthesized. Thus, the particular details of the initial design and simulation may vary.

The RTL design 915 or equivalent may be further synthesized by the design facility into a hardware model 920, which may be in a hardware description language (HDL), or some other representation of physical design data. The HDL may be further simulated or tested to verify the IP core design. The IP core design can be stored for delivery to a third party fabrication facility 965 using non-volatile memory 940 (e.g., hard disk, flash memory, or any non-volatile storage medium). Alternately, the IP core design may be transmitted (e.g., via the Internet) over a wired connection 950 or wireless connection 960. The fabrication facility 965 may then fabricate an integrated circuit that is based at least in part on the IP core design. The fabricated integrated circuit can be configured to perform operations in accordance with at least one embodiment described herein.

The following examples pertain to further embodiments.

In one example, an apparatus includes: a global prediction circuit having a plurality of global entries each to store global prediction information for a corresponding branch instruction; and a context-based prediction circuit to receive an instruction address for a branch instruction and a plurality of predictions associated with the branch instruction from the global prediction circuit. The context-based prediction circuit may include: a table having a plurality of entries each to store a context prediction value for a corresponding branch instruction; and a control circuit to generate, for the branch instruction, an index value to index into the table, the control circuit to generate the index value based at least in part on at least some of the plurality of predictions associated with the branch instruction and the instruction address for the branch instruction.

In an example, the control circuit is to access a first context prediction value of a first entry of the table based on the index value. In an example, the control circuit is to output a final prediction for the branch instruction comprising a predetermined one of the plurality of predictions associated with the branch instruction when the first context prediction value is less than a threshold value.

In an example, the predetermined one of the plurality of predictions comprises a prediction of the plurality of predictions associated with a longest history.

In an example, the control circuit is to output the final prediction for the branch instruction based on the first context prediction value when the first context prediction value exceeds the threshold value.

In an example, when the first context prediction value is greater than the threshold value and is a positive value, the control circuit is to output the final prediction for the branch instruction comprising a taken prediction.

In an example, the control circuit is to update the first context prediction value of the first entry in a first direction in response to a determination of a correct prediction for the branch instruction, and update the first context prediction value of the first entry in a second direction in response to a determination of an incorrect prediction for the branch instruction.

In an example, the control circuit is to send the index to an instruction fetch unit with the final prediction.

In an example, the apparatus further comprises an execution pipeline to execute the branch instruction, where the index is to pass through the execution pipeline with the branch instruction.

In an example, the table comprises a direct-mapped tagless structure.

In another example, a method comprises: receiving, in a control circuit of a processor from a first set of predictors, a plurality of predictions for a first branch instruction; generating an index based at least in part on at least some of the plurality of predictions and at least a portion of an instruction address of the first branch instruction; accessing a predictor table using the index to obtain a counter value; and in response to the counter value exceeding a threshold value, outputting a final prediction for the first branch instruction based on the counter value.

In an example, the method further comprises in response to the counter value not exceeding the threshold value, outputting the final prediction for the first branch instruction based on one of the plurality of predictions.

In an example, the method further comprises sending the final prediction to an instruction fetch unit to cause the instruction fetch unit to fetch a target of the first branch instruction based on the final prediction.

In an example, the method further comprises: updating the counter value in a first direction based on feedback information to indicate that the final prediction was correctly predicted; and updating the counter value in a second direction based on feedback information to indicate that the final prediction was incorrectly predicted.

In an example, the method further comprises generating the index further based on additional context information.

In an example, the additional context information comprises a hit vector that identifies which of the first set of predictors found a matching tag for the first branch instruction.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a processor that includes at least one core and a system memory coupled to the processor. The at least one core in turn may include an instruction fetch circuit to fetch instructions and a branch predictor coupled to the instruction fetch circuit to predict a direction of branch instructions. The branch predictor may comprise: a global history predictor having a plurality of tables to store global predictions for a corresponding history duration; and a second predictor comprising a context table having a plurality of entries each to store a context prediction for a corresponding branch instruction, where the branch predictor is to override a plurality of global predictions output from the global history predictor for a first branch instruction with a final prediction comprising a first context prediction output from the second predictor for the first branch instruction based on a comparison between the first context prediction and a threshold value, the branch predictor to provide the final prediction to the instruction fetch circuit to cause the instruction fetch circuit to fetch a target of the first branch instruction using the final prediction.

In an example, the branch predictor is to override the plurality of global predictions when the first context prediction exceeds the threshold value, and instead to provide one of the plurality of global predictions as the final prediction when the first context prediction is less than the threshold value.

In an example, the branch predictor is to generate an index to index into the context table based at least in part on at least some of the plurality of global predictions for the first branch instruction and an instruction address for the first branch instruction.

In an example, the branch predictor is to: provide the index to the instruction fetch circuit with the final prediction to cause the index to flow through a pipeline of the core with the first branch instruction; and receive feedback information after execution of the first branch instruction, the feedback information comprising the index and a prediction result, and update the first context prediction on based on the prediction result.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a global prediction circuit having a plurality of global tables including global entries each to store global prediction information for a corresponding branch instruction; and
   a context-based prediction circuit to receive an instruction address for a branch instruction and a plurality of predictions from the plurality of global tables of the global prediction circuit, each of the plurality of predictions associated with the branch instruction, the context-based prediction circuit comprising:
      a table having a plurality of entries each to store a context prediction value for a corresponding branch instruction; and
      a control circuit to generate, for the branch instruction, an index value to index into the table, the control circuit to generate the index value based at least in part on at least some of the plurality of predictions associated with the branch instruction and the instruction address for the branch instruction.

2. The apparatus of claim 1, wherein the control circuit is to access a first context prediction value of a first entry of the table based on the index value.

3. The apparatus of claim 2, wherein the control circuit is to output a final prediction for the branch instruction comprising a predetermined one of the plurality of predictions associated with the branch instruction when the first context prediction value is less than a threshold value.

4. The apparatus of claim 3, wherein the predetermined one of the plurality of predictions comprises a prediction of the plurality of predictions associated with a longest history.

5. The apparatus of claim 3, wherein the control circuit is to output the final prediction for the branch instruction based on the first context prediction value when the first context prediction value exceeds the threshold value.

6. The apparatus of claim 5, wherein when the first context prediction value is greater than the threshold value and is a positive value, the control circuit is to output the final prediction for the branch instruction comprising a taken prediction.

7. The apparatus of claim 2, wherein the control circuit is to update the first context prediction value of the first entry in a first direction in response to a determination of a correct prediction for the branch instruction, and update the first context prediction value of the first entry in a second direction in response to a determination of an incorrect prediction for the branch instruction.

8. The apparatus of claim 1, wherein the table comprises a direct-mapped tagless structure.

9. At least one non-transitory computer readable storage medium having stored thereon instructions, which if performed by a machine cause the machine to perform a method comprising:
   receiving, in a control circuit of a processor from a first set of predictors, a plurality of predictions for a first branch instruction, each of the plurality of predictions obtained from a corresponding one of the first set of predictors;
   generating an index based at least in part on at least some of the plurality of predictions and at least a portion of an instruction address of the first branch instruction;
   accessing a predictor table using the index to obtain a counter value; and
   in response to the counter value exceeding a threshold value, outputting a final prediction for the first branch instruction based on the counter value.

10. The at least one non-transitory computer readable storage medium of claim 9, wherein the method further comprises in response to the counter value not exceeding the threshold value, outputting the final prediction for the first branch instruction based on one of the plurality of predictions.

11. The at least one non-transitory computer readable storage medium of claim 9, wherein the method further comprises sending the final prediction to an instruction fetch unit to cause the instruction fetch unit to fetch a target of the first branch instruction based on the final prediction.

12. The at least one non-transitory computer readable storage medium of claim 9, wherein the method further comprises:
   updating the counter value in a first direction based on feedback information to indicate that the final prediction was correctly predicted; and
   updating the counter value in a second direction based on feedback information to indicate that the final prediction was incorrectly predicted.

13. A system comprising:
   a processor including at least one core, the at least one core including:
      an instruction fetch circuit to fetch instructions; and
      a branch predictor coupled to the instruction fetch circuit to predict a direction of branch instructions, the branch predictor comprising:
         a global history predictor having a plurality of tables to store global predictions for a corresponding history duration, each of the plurality of tables to output one of a plurality of global predictions each associated with a first branch instruction; and
         a second predictor comprising a context table having a plurality of entries each to store a context prediction for a corresponding branch instruction, wherein the branch predictor is to override the plurality of global predictions output from the global history predictor for the first branch instruction with a final prediction comprising a first context prediction output from the second predictor for the first branch instruction based on a comparison between the first context prediction and a threshold value, the branch predictor to provide the final prediction to the instruction fetch circuit to cause the instruction fetch circuit to fetch a target of the first branch instruction using the final prediction, wherein the branch predictor is to generate an index to index into the context table based at least in part on at least some of the plurality of global predictions for the first branch instruction and an instruction address for the first branch instruction; and
   a system memory coupled to the processor.

14. The system of claim 13, wherein the branch predictor is to override the plurality of global predictions when the first context prediction exceeds the threshold value, and instead to provide one of the plurality of global predictions as the final prediction when the first context prediction is less than the threshold value.

15. The system of claim 13, wherein the branch predictor is to:
   receive feedback information after execution of the first branch instruction, the feedback information comprising the index and a prediction result, and update the first context prediction on based on the prediction result.

* * * * *